(12) United States Patent
Inagaki et al.

(10) Patent No.: US 12,071,091 B2
(45) Date of Patent: Aug. 27, 2024

(54) VEHICLE DOOR TRIM

(71) Applicants: SHIGERU CO., LTD., Ota (JP); SUBARU CORPORATION, Tokyo (JP)

(72) Inventors: Kenji Inagaki, Ota (JP); Shunya Watanabe, Tokyo (JP)

(73) Assignees: Shigeru Co., LTD., Ota (JP); Subaru Corporation, Tokyo (JP)

( * ) Notice: Subject to any disclaimer, the term of this patent is extended or adjusted under 35 U.S.C. 154(b) by 0 days.

(21) Appl. No.: 18/140,281

(22) Filed: Apr. 27, 2023

(65) Prior Publication Data

US 2023/0365090 A1   Nov. 16, 2023

(30) Foreign Application Priority Data

May 12, 2022   (JP) .................................. 2022-078648

(51) Int. Cl.
  *B60R 21/04*   (2006.01)
  *B60R 13/02*   (2006.01)
(52) U.S. Cl.
  CPC ...... *B60R 21/0428* (2013.01); *B60R 13/0243* (2013.01)
(58) Field of Classification Search
  CPC . B60R 21/04; B60R 21/0246; B60R 21/0428; B60R 2021/0414
  See application file for complete search history.

(56) References Cited

U.S. PATENT DOCUMENTS

| | | | | |
|---|---|---|---|---|
| 5,433,478 A | * | 7/1995 | Naruse | B60R 21/0428 296/146.7 |
| 5,573,272 A | * | 11/1996 | Teshima | B60R 21/0428 296/146.7 |
| 5,934,730 A | | 8/1999 | Yagishita et al. | |
| 6,036,251 A | | 3/2000 | Yagishita et al. | |
| 10,300,771 B2 | * | 5/2019 | Arimoto | B60J 5/0455 |
| 10,336,276 B2 | * | 7/2019 | Tallapragada | B60R 21/0428 |
| 2010/0259069 A1 | * | 10/2010 | Suzuki | B60J 5/0451 296/187.12 |
| 2015/0115585 A1 | * | 4/2015 | Smith | B60R 21/0428 280/751 |

FOREIGN PATENT DOCUMENTS

JP   H08-011539 A   1/1996

* cited by examiner

*Primary Examiner* — James A English
(74) *Attorney, Agent, or Firm* — Jodi A. Reynolds, Esq.; Harter Secrest & Emery LLP

(57) ABSTRACT

A vehicle door trim includes a side collision energy absorbing structure with a relatively simple structure that gives a good side collision energy absorbing performance while avoiding breakage of a door trim body. The side collision energy absorbing structure 5 includes a first energy absorber 10 formed as a separate body from a door trim body 1 and a second energy absorber 20 integrally formed with the door trim body 1. The first energy absorber 10 includes a peripheral wall 11 extending over a generally entire periphery thereof and an end wall 12 that closes a distal end of the peripheral wall 11. A basal end of the peripheral wall 11 is fixed to the door trim body 1. The second energy absorber 20 is protruded outward in the vehicle width direction and is disposed in an inner space 15 of the first energy absorber 10.

4 Claims, 3 Drawing Sheets

VEHICLE DOOR TRIM

FIELD OF THE INVENTION

The present invention relates to a vehicle door trim, and particularly relates to an improvement of a side collision energy absorbing structure disposed on an outside of a door trim body in a vehicle width direction.

BACKGROUND OF THE INVENTION

A vehicle door trim is provided with a side collision energy absorbing structure that is buckled or plastically deformed to protect occupants when a side collision occurs. Generally, a side collision energy absorbing structure is integrally formed with a door trim body or is formed as a separate body and fixed to the door trim body. Since it is required that a side collision energy absorbing structure absorb great side collision energy while avoiding damages to a trim body, the side collision energy absorbing structure tends to have complicated structure, and forming thereof tends to be difficult.

A side collision energy absorbing structure disclosed in FIG. 5 of Patent Document 1 (Japanese Patent Application Publication No. H8-11539) includes a first energy absorber formed separately from a door trim body and a second energy absorber integrally formed with the door trim body. The first energy absorber is disposed spaced from the door trim body and fixed to the door trim body. The second energy absorber is disposed between the door trim body and the first energy absorber.

SUMMARY OF THE INVENTION

Problem to be Solved by the Invention

In the case of the side collision energy absorbing structure disclosed in Patent Document 1, difficulty in forming is alleviated by combining the first energy absorber formed separately from the door trim body with the second energy absorber integrally formed with the door trim body. However, the first energy absorber still has a complicated structure. Further, a great load may be applied to the trim body at a time of side collision energy absorption, which may lead to damages to the door trim body, such as breakage.

Means for Solving the Problems

To solve the problems mentioned above, the present invention provides a vehicle door trim including: a door trim body made of resin; and a side collision energy absorbing structure disposed on an outside of the door trim body in a vehicle width direction, wherein the side collision energy absorbing structure includes: a first energy absorber made of resin and formed as a separate body from the door trim body, wherein the first energy absorber is disposed so as to be protruded from the door trim body outwardly in the vehicle width direction, and wherein the first energy absorber includes: a peripheral wall disposed over a generally entire periphery of the first energy absorber, wherein a basal end of the peripheral wall is fixed to the door trim body: and an end wall that closes a distal end of the peripheral wall; and a second energy absorber integrally formed with the door trim body so as to be protruded outward in the vehicle width direction, wherein the second energy absorber is disposed in an inner space of the first energy absorber.

According to the features mentioned above, a load to the door trim body at the time of side collision can be reduced, and damages to the door trim body such as breakage can be avoided. The first reason is that the peripheral wall of the first energy absorber is formed over the generally entire periphery, and therefore an impact load at a time of side collision is distributed. The second reason is that the side collision energy is also absorbed by the second energy absorber, the amount of energy the first energy absorber should absorb is reduced compared with when the first energy absorber absorbs the side collision energy alone. Further, the side collision energy absorbing structure can be simplified and manufactured with a reduced cost since the first energy absorber has a simple cup configuration and the second energy absorber is received in the inner space of the first energy absorber.

Preferably, a distal end portion of the second energy absorber is spaced from the end wall of the first energy absorber in the vehicle width direction. According the features mentioned above, the side collision energy is absorbed by the first energy absorber alone at an initial stage of the side collision. Accordingly, the load to the door trim body can be further reduced.

Preferably, the second energy absorber includes a protruded portion protruded in the vehicle width direction and a receiving portion formed at a distal end of the protruded portion, wherein the receiving portion extending in parallel with the end wall of the first energy absorber is opposed to the end wall of the first energy absorber. According the features mentioned above, the receiving portion of the second energy absorber surely receives an impact load from the end wall of the first energy absorber. Therefore, the second energy absorber can perform the side collision energy absorption well by deformation of the protruded portion thereof.

Preferably, the protruded portion of the second energy absorber includes at least one protruded plate, and wherein the receiving portion includes a receiving plate that makes a right angle with the at least one protruded plate. According the features mentioned above, the structure of the second energy absorber can be further simplified, and formability thereof can be enhanced.

Preferably, the peripheral wall of the first energy absorber has a circular cross-sectional configuration, wherein the peripheral wall is tapered such that a diameter thereof is reduced toward the distal end, wherein an annular flange portion is formed in the basal end of the peripheral wall and is fixed to the door trim body. According the features mentioned above, the peripheral wall of the first energy absorber can be generally evenly buckled. Thereby, the load to the door trim body 1 can be further reduced.

Advantageous Effects of the Invention

According to the side collision energy absorbing structure of the present invention, load to the door trim body at a time of side collision can be reduced while sufficient side collision energy absorption can be performed. Thereby, damages to the door trim body such as breakage can be avoided and the structure can be simplified.

DETAILED DESCRIPTION OF THE INVENTION

Figure 1:
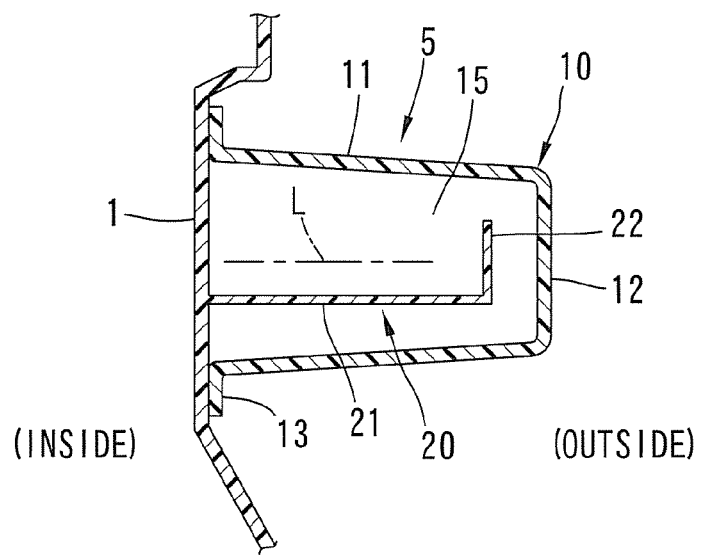
FIG. 1 is a cross-sectional view of a side collision energy absorbing structure of a vehicle door trim according to one embodiment of the present invention.

A vehicle door trim according to one embodiment of the present invention will be described hereinafter with reference to the drawings. As shown in FIG. 1, the door trim includes a door trim body 1 formed by injection molding a resin such as polypropylene. A side collision energy absorbing structure 5 is disposed on an outside of the door trim body 1 in a vehicle width direction. A door panel (not shown) is disposed outside of the side collision energy absorbing structure 5 in the vehicle width direction.

<Features of the Side Collision Energy Absorbing Structure>

Figure 2:
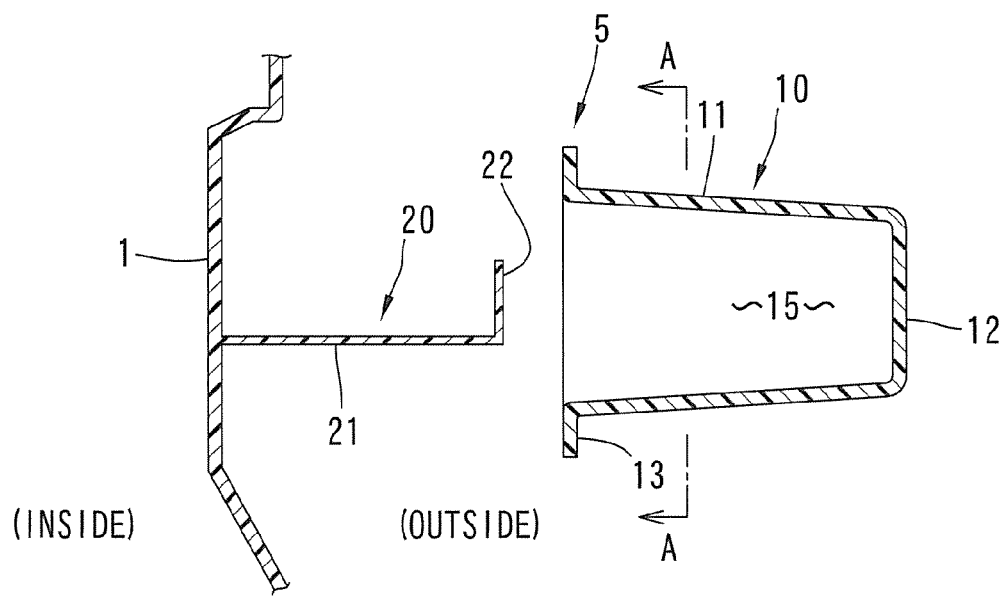
FIG. 2 is an exploded cross-sectional view of the side collision energy absorbing structure.
Figure 2A:
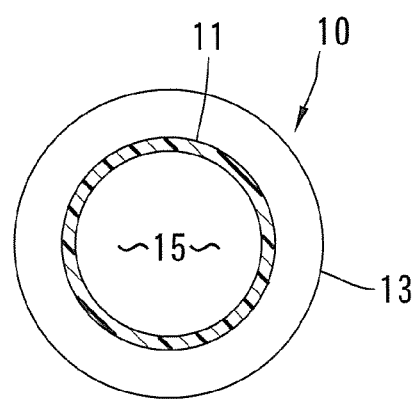
FIG. 2A is a cross-sectional view of the first energy absorber taken along lines A-A.

As shown in FIG. 2 in an exploded manner, the side collision energy absorbing structure 5 includes a first energy absorber 10 manufactured in separate steps from the door trim body 1 and a second energy absorber 20 concurrently and integrally formed with the door trim body 1.

The first energy absorber 10 is formed by press molding a sheet made of resin such as polypropylene into a cup configuration. The first energy absorber 10 includes a peripheral wall 11 surrounding an entire periphery thereof, an end wall 12 closing a distal end of the peripheral wall 11 and an annular flange portion 13 projecting out from a basal end of the peripheral wall 11 in a radial direction. The peripheral wall 11 has a circular cross-sectional configuration and is tapered such that a diameter thereof is reduced toward the end wall 12. The first energy absorber 10 includes an inner space 15.

The second energy absorber 20 includes a protruded plate 21 (protruded portion) and a receiving plate 22 (receiving portion). The protruded plate 21 has an elongated plate configuration protruded outward in the vehicle width direction generally orthogonally with respect to the door trim body 1. The receiving plate 22 has a configuration of a plate extending from a distal end of the protruded plate 21 at a right angle with respect to the protruded plate 21. The second energy absorber 20 has a generally L-shaped configuration.

The first energy absorber 10 is mounted on the door trim body 1 so as to be protruded outward in the vehicle width direction by fixing the flange portion 13 onto an outside surface of the door trim body 1 by means of welding or the like. A central axis L of the peripheral wall 11 extends generally orthogonally with the door trim body 1. The end wall 12 of the first energy absorber 10 is spaced from the door trim body 1 in the vehicle width direction. The end wall 12 is opposed to the door panel (not shown) in a vicinity of the door panel.

The second energy absorber 20 is received in the inner space 15 of the first energy absorber 10. The protruded plate 21 of the second energy absorber 20 is disposed offset from the central axis L of the first energy absorber 10. The receiving plate 22 extends generally in parallel with the end wall 12 of the first energy absorber 10. The receiving plate 22 is spaced from and opposed to the end wall 12.

<Working of the Side Collision Energy Absorbing Structure>

At a time of side collision, the side collision energy absorbing structure 5 is sandwiched between the door panel and the door trim body 1, receives an impact load in the vehicle width direction and absorbs the side collision energy by buckling or plastic deformation. A detailed description is given below.

Figure 3:
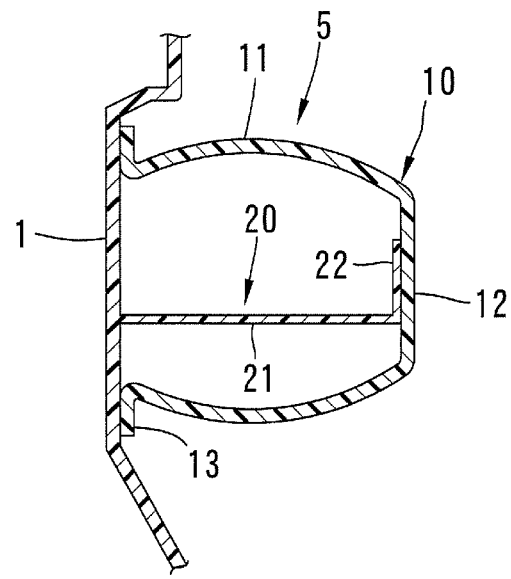
FIG. 3 is a cross-sectional view of the side collision energy absorbing structure, showing a first energy absorber in a deformed state at a time of side collision.

At an initial stage of the side collision, the end wall 12 of the first energy absorber 10 is hit against the door panel. By a compression impact load in the vehicle width direction (direction of the central axis L), the peripheral wall 11 of the first energy absorber 10 is swollen deformed as shown in FIG. 3. Since the peripheral wall 11 is tapered toward the distal end and has a circular cross-sectional configuration, the peripheral wall 11 can be generally evenly deformed in a reliable manner.

Figure 4:
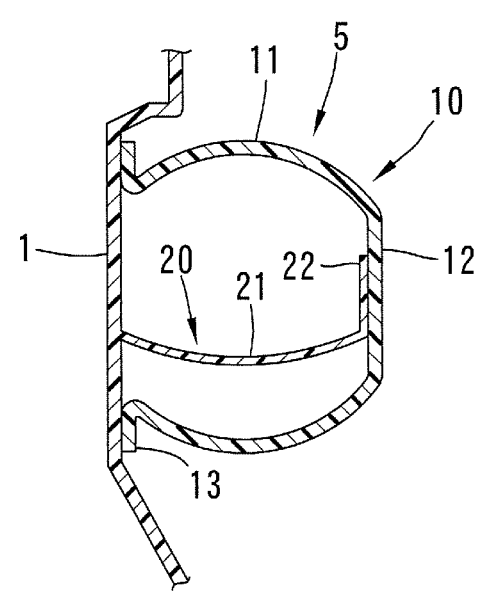
FIG. 4 is a cross-sectional view of the side collision energy absorbing structure, showing the first energy absorber in a further deformed state and a second energy absorber also in a deformed state.

When the deformation of the peripheral wall 11 of the first energy absorber 10 proceeds, the end wall 12 of the first energy absorber 10 is hit against the receiving plate 22 of the second energy absorber 20 as shown in FIG. 3. When the deformation of the peripheral wall 11 of the first energy absorber 10 proceeds further, the protruded plate 21 of the second energy absorber 20 as well as the peripheral wall 11 of the first energy absorber 10 is deformed as shown in FIG. 4. Thereby, great side collision energy can be absorbed. Since the receiving plate 22 of the second energy absorber 20 opposed to the end wall 12 of the first energy absorber 10 receives the load, the protruded plate 21 can be surely deformed.

Since the peripheral wall 11 of the first energy absorber 10 is formed over the entire periphery, the impact load is distributed. Further, since the peripheral wall 11 has a circular cross-sectional configuration, the impact load can be generally evenly distributed. As a result, the load to the door trim body 1 can be alleviated.

The second energy absorber 20 contributes to the absorption of the side collision energy. In this embodiment, ratio of an amount of side collision energy absorption by the second energy absorber 20 to an amount of side collision energy absorption by the first energy absorber 10 is 1:2 to 1:4, for example. Therefore, the first energy absorber 10 can absorb the side collision energy sufficiently even with a reduced rigidity compared with when the first energy absorber absorbs the side collision energy alone. This feature also contributes to reducing the load to the door trim body 1.

Since the end wall 12 of the first energy absorber 10 and the receiving plate 22 of the second energy absorber 20 are spaced from each other, the load to the door trim body 1 at the initial stage of side collision can be reduced.

Since the load to the door trim body 1 at the time of the side collision energy absorption can be reduced as described above, damages such as breakage to the door trim body 1 can be avoided.

The side collision energy absorbing structure 5, including the first energy absorber 10 having the simple cup configuration and the second energy absorber 20 having the L-shaped plate configuration, can give a sufficient side collision energy absorption performance with a relatively simple structure.

The present invention is not limited to the embodiments described above, and various modifications may be adopted. The amount of side collision energy absorption by the second energy absorber may be smaller than the one in the embodiment described above. Alternatively, the amount may be greater than the one in the embodiment described above and generally the same as the amount absorbed by the first energy absorber, for example. The peripheral wall of the first energy absorber may have a polygonal cross-sectional configuration or an ellipsoidal cross-sectional configuration. The configuration of the second energy absorber is not limited to L-shaped. The second energy absorber may have a gate-shaped configuration including a pair of protruded plates and a receiving plate laid between distal ends of the pair of protruded plates at right angle with the protruded plates.

The invention claimed is:

1. A vehicle door trim comprising:
   a door trim body made of resin; and
   a side collision energy absorbing structure disposed on an outside of the door trim body in a vehicle width direction, wherein the side collision energy absorbing structure comprises:
   a first energy absorber made of resin and formed as a separate body from the door trim body, wherein the first energy absorber is disposed so as to be protruded from the door trim body outwardly in the vehicle width direction, and wherein the first energy absorber comprises:
      a peripheral wall disposed over a generally entire periphery of the first energy absorber, wherein a basal end of the peripheral wall is fixed to the door trim body; and
      an end wall that closes a distal end of the peripheral wall; and
   a second energy absorber integrally formed with the door trim body so as to be protruded outward in the vehicle width direction, wherein the second energy absorber is disposed in an inner space of the first energy absorber, and
   wherein a distal end portion of the second energy absorber is spaced from the end wall of the first energy absorber in the vehicle width direction.

2. The vehicle door trim according to claim 1, wherein the second energy absorber comprises a protruded portion protruded in the vehicle width direction and a receiving portion formed at a distal end of the protruded portion, wherein the receiving portion comprises a surface extending in parallel with the end wall of the first energy absorber, and wherein the surface is spaced from and opposed to the end wall of the first energy absorber.

3. The vehicle door trim according to claim 2, wherein the protruded portion of the second energy absorber comprises at least one protruded plate, and wherein the receiving portion comprises a receiving plate that makes a right angle with the at least one protruded plate.

4. The vehicle door trim according to claim 1, wherein the peripheral wall of the first energy absorber has a circular cross-sectional configuration, wherein the peripheral wall is tapered such that a diameter thereof is reduced toward the distal end, wherein an annular flange portion is formed in the basal end of the peripheral wall and is fixed to the door trim body.

* * * * *